United States Patent [19]
Hnat et al.

[11] Patent Number: 5,558,690
[45] Date of Patent: Sep. 24, 1996

[54] MANUFACTURE OF CERAMIC TILES FROM SPENT ALUMINUM POTLINING

[75] Inventors: James G. Hnat, Collegeville, Pa.; Akshay Mathur, Tampa, Fla.

[73] Assignee: Vortec Corporation, Collegeville, Pa.

[21] Appl. No.: 364,478

[22] Filed: Dec. 23, 1994

[51] Int. Cl.$^6$ .................. C01F 7/04; C01F 7/50
[52] U.S. Cl. .............. 65/134.8; 65/33.7; 65/19; 501/155; 423/111; 588/248
[58] Field of Search ............. 65/19, 20, 134.8, 65/33.7, 33.9, 90, 95, 66; 501/155; 423/111, 130, 119; 588/248

[56] References Cited

U.S. PATENT DOCUMENTS

| | | | |
|---|---|---|---|
| 3,498,775 | 3/1970 | Simmons | 65/33.7 X |
| 4,113,832 | 9/1978 | Bell et al. | 423/119 |
| 4,160,809 | 7/1979 | Andersen et al. | 423/119 |
| 4,397,670 | 8/1983 | Beall | 65/33.7 |
| 4,444,740 | 4/1984 | Snodgrass et al. | 423/389 |
| 4,544,394 | 10/1985 | Hnat | 65/19 |
| 4,735,784 | 4/1988 | Davis et al. | 423/111 |
| 4,956,158 | 9/1990 | Nguyen et al. | 423/111 |
| 4,957,527 | 9/1990 | Hnat | 65/19 |
| 5,024,822 | 6/1991 | Hittner et al. | 423/111 |
| 5,035,735 | 7/1991 | Pieper et al. | 65/134.8 |
| 5,164,174 | 11/1992 | Banker et al. | 423/659 |
| 5,175,134 | 12/1992 | Kaneko et al. | 501/155 |
| 5,203,901 | 4/1993 | Sizuki et al. | 65/33.7 |
| 5,230,845 | 7/1993 | Hashimoto et al. | 264/56 |
| 5,245,115 | 9/1993 | Barrillon et al. | 588/248 |
| 5,245,116 | 9/1993 | Bontron et al. | 588/248 |
| 5,352,419 | 10/1994 | Jenkins | 423/126 |
| 5,365,012 | 11/1994 | Barrillon et al. | 588/248 |
| 5,476,990 | 12/1995 | Hittner et al. | 588/201 |

FOREIGN PATENT DOCUMENTS

| | | | |
|---|---|---|---|
| 31941/93 | 7/1993 | Australia | 588/248 |
| 0937414 | 6/1982 | U.S.S.R. | 501/155 |

OTHER PUBLICATIONS

Kraev et al., "Utilization of local raw material and industrial wastes in ceramic products", Glass & Ceramic, (USA), vol. 34, No. 11–12, pp. 749–52.

*Primary Examiner*—Donald E. Czaja
*Assistant Examiner*—Jose A. Fortuna
*Attorney, Agent, or Firm*—Nixon, Hargrave, Devans & Doyle

[57] ABSTRACT

The present invention relates to a process for forming glass-ceramic tiles. Spent aluminum potliner containing carbonaceous material, fluorine, and glass forming materials is oxidized under conditions effective to combust the carbonaceous material and volatilize partially the fluorine in the glass forming materials. The oxidized glass forming materials are vitrified to form a glass melt. This glass melt is then formed into tiles containing fluorine.

20 Claims, 4 Drawing Sheets

MANUFACTURE OF CERAMIC TILES FROM SPENT ALUMINUM POTLINING

FIELD OF THE INVENTION

This invention relates to the manufacture of glass-ceramic tiles from spent aluminum potlining.

BACKGROUND OF THE INVENTION

In the production of metallic aluminum, reduction-grade $Al_2O_3$ typically undergoes electrolysis in a Hall-Heroult cell. This cell is a large, flat-bottomed vessel, or pot, that contains a molten batch of a fluoride electrolyte, such as cryolite ($Na_3AlF_6$), alumina ($Al_2O_3$), and aluminum fluoride ($AlF_3$). The pots are steel shells which are lined with a carbonaceous material. This carbonaceous liner acts as the cathode for the electrolytic process, while a carbon block suspended above the bath surface acts as the anode. During the reduction process, a high level of current passing from the anode to the cathode generates the heat required to maintain high process temperatures and to reduce electrolytically the electrolyte solution into molten aluminum metal. The molten aluminum is collected at the cathode potliner. During the life of the cathode, the carbon material becomes saturated with the cryolite electrolyte solution causing degradation of the lining. Due to the high temperatures employed in the electrolytic reduction process and chemical reactions with the molten bath, gradual aging of the carbonaceous cathode and refractory lining also takes place. The combined result of this degradation and aging is the formation of cracks in the lining, which prohibits further operation of the cell until the cracked carbonaceous lining is replaced. The unusable lining, containing primarily carbonaceous material, refractory, cryolite salt, and cyanide, is typically referred to as "spent potliner" or "spent potlining". In most instances, the spent potlining is either landfilled or stockpiled on site as a tailings pile or in sludgeponds. In large aluminum reduction facilities, spent potlining must be continuously replaced, and, consequently, the quantity of spent potlining landfilled or stockpiled increases daily.

The Environmental Protection Agency has classified spent potliner as a hazardous waste, because: (1) iron cyanide complexes, free fluorines, and free cyanides are present in significant concentrations; (2) free cyanide is extremely toxic to both humans and aquatic life if ingested; and (3) data indicates significant amounts of free cyanides, free fluorines, and iron cyanide will leach from spent potliners if they are exposed to rainwater when stored or disposed of in unprotected piles outdoors, thereby contaminating water supplies and other valuable resources. Under the EPA program, therefore, aluminum companies must treat the spent potliners prior to landfilling.

There are a number of processes directed to removing fluorines from spent aluminum potlining so that the solid waste material is more suitable for disposal in a landfill.

Several methods already have been recommended for the recovery of fluoride salts and alumina content of the spent potlining material. One method involves the pyrohydrolysis of the spent cell material or potlining in a fluidized bed reactor. Pyrohydrolysis involves contacting a fluidized bed of spent potlining with water or steam to react with the fluorine compounds to form hydrogen fluoride. During pyrohydrolysis, sodium fluoride and other sodium compounds in the potlining form sodium fluoride and sodium oxide vapors.

It is known to use limestone, calcium carbonate, to react with fluoride in the spent potlining at about 700°–780° C. to form a calcium fluoride. However, the final product still has a high level of leachable fluoride. An article in *Light Metals*, 1981, entitled "Recovery of Fluoride and Fluorine Balance of Aluminum Smelting Plant" describes a process of treating spent potlining wherein the potlining is crushed, incinerated, and introduced into a crusher for pulverizing and extraction of the fluorides into water. After filtration, the material is introduced into a mixing tank, and sulfuric acid and calcium carbonate are added to produce calcium fluoride. The slurry is desiccated, and the sludge sent to a disposal site. The fluoride-containing filtrate is used as the scrubbing solution in a wet scrubber.

U.S. Pat. No. 4,113,832 to Bell et. al. discloses a process in which spent potlining undergoes pyrohydrolysis, substantially combusting all of the carbon content and removing the fluoridic components of the spent potlining with off-gases. The process produces a solid clinker-type material that is subjected to alkaline digestion for recovery of an alkali aluminate solution from which high purity aluminum is recovered.

U.S. Pat. No. 4,444,740 to Snodgrass et. al. discloses a process to treat spent potlining by incinerating it at a temperature suitable to destroy the cyanides and substantially to limit volatilization of the fluorides. This is followed by leaching the incineration step's solid residue with a dilute caustic. The leachate is treated with a calcium compound to precipitate calcium fluoride. The calcium fluoride is ultimately used to recover fluorides which serve as a feed material to a reduction cell for aluminum manufacture. The solids resulting from this process are sent to a disposal site.

U.S. Pat. No. 4,735,784 to Davis et. al. melts spent potlining into a liquid slag by combusting carbon present in the spent potliner in a smeltor at a temperature of 1000°–1700° C. The slag is then held at elevated temperatures for a period of time sufficient for the contaminants to decompose to harmless components or for a portion of the contaminants to evaporate or sublime from the liquid. The liquid is then cooled, whereby a glassy solid is formed with contaminant residues encapsulated in the slag. The glassy solid is suitable for landfill disposal. Steam is added to the smeltor to convert fluorides in the spent potliner to hydrogen fluoride gas. Additionally, fluoride gas is generated from slag in the holding furnace. As a result, substantially all fluorides are volatilized, with any remaining fluorides in the glassy solid being fully immobilized.

U.S. Pat. No. 5,024,822 to Hittner et. al. discloses a process for treating spent potlining by incineration at a temperature low enough to maintain low fluorine vapor pressure and high enough to combust at least 50% by weight of the carbonaceous material in the potlining, typically 500°–850° C. Vaporization of fluorine is limited by combusting the carbonaceous material at a low moisture content. A siliceous material is admixed with the potlining either before or after this ash forming stage. The ash and siliceous material are heated to a temperature of at least 1100° C. to form a glassy residue in which fluorides are dispersed and fixed. In view of the low leachability of fluoride from this material, it is suitable for landfill.

Although these procedures have been found to be useful in converting spent aluminum potlining to a form suitable for landfill, they do not produce a useful product. As a result, economic justification for the capital and operational costs of implementing such procedures for treatment of spent potlining tend to be problematic. The present invention is directed to overcoming these deficiencies.

SUMMARY OF THE INVENTION

The present invention relates to a process for forming glass-ceramic tiles. Spent aluminum potliner containing carbonaceous material, fluorine, and glass forming materials is oxidized under conditions effective to combust the carbonaceous material and volatilize partially the fluorine in the glass forming materials. The oxidized glass forming materials are vitrified to form a glass melt. This glass melt is then formed into tiles containing fluorine.

Another aspect of the present invention relates to a glass-ceramic tile having the composition of 5–20 wt. % $Na_2O$, 10–30 wt. % $Al_2O_3$, 5–20 wt. % CaO, 0–15 wt. % MgO, 0–8 wt. % $Fe_2O_3$, 35–70 wt. % $SiO_2$, 0–5 wt. % $B_2O_3$, 0–5 wt. % F, 0–10 wt. % $TiO_2$, 0–5 wt. % $ZrO_2$, 0–5 wt. % other oxides and a breaking strength of 500 to 720 lbs. for typical wall tiles.

The present invention provides a use for spent aluminum potlining as a feedstock for the production of glass or glass-ceramic tiles. The need for currently-used agglomeration techniques is eliminated and a high-value end-product with significant market demand is produced. The present invention saves energy and has the potential to reduce the quantity of spent potlining which must be disposed in landfills.

DETAILED DESCRIPTION OF THE INVENTION

Figure 1:
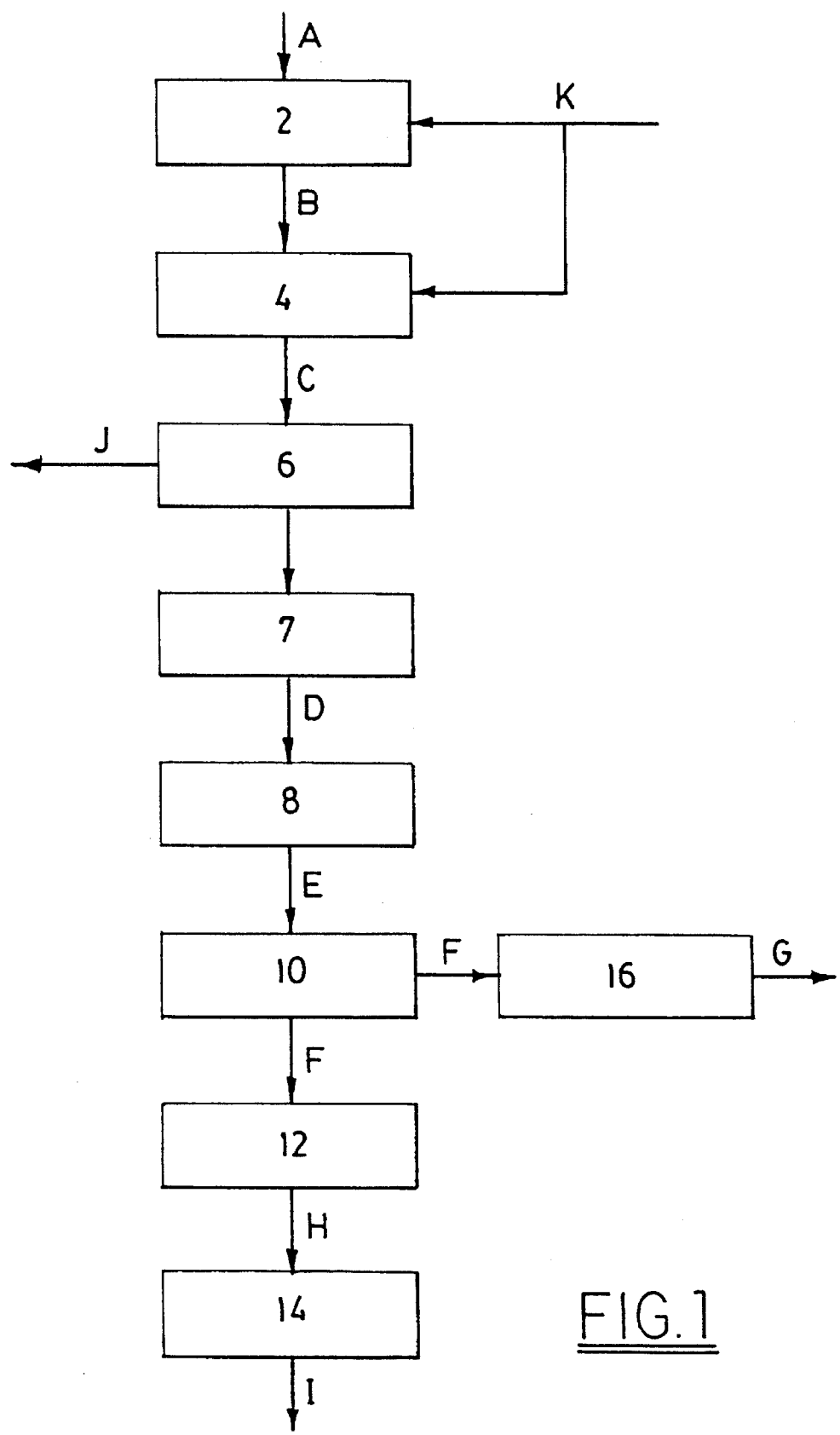
FIG. 1 is a schematic flow diagram of the process of the present invention.

The present invention relates to a process for forming glass-ceramic tiles. Spent aluminum potliner containing carbonaceous material, fluorine, and glass forming materials are oxidized under conditions effective to combust the carbonaceous material and volatize partially the fluorine in the glass forming materials. The oxidized glass forming materials are vitrified to form a glass melt and this glass melt is then formed into tiles containing fluorine.

Almost all spent potlinings obtained from the electrolytic aluminum reduction cells contain, in addition to the major component of carbonaceous material, a significant quantity of noncarbonaceous matter. The noncarbonaceous content can vary within wide limits, depending upon the operating conditions of the pot, the type of electrolyte employed and the age of the lining. The composition of a typical spent potlining is given in Table 1.

TABLE 1

Composition of Typical Spent Potlining

| Constituent | Concentration Range (ppm) |
|---|---|
| Arsenic | .001–26 |
| Barium | <.09–200 |
| Cadmium | .01–4.9 |
| Chromium | <.01–33 |
| Lead | <.01–44 |
| Mercury | <.0002–.49 |
| Selenium | .004–.96 |
| Silver | .01–2 |
| Cyanides | <.02–64,000 |
| Reactive Cyanide | 1.09–30.9 |
| Fluoride | 230–250,000 |
| Reactive Sulfide | <.11–6.24 |
| Aluminum | 47,000–222,000 |
| Antimony | 13–33 |
| Beryllium | 6.2–17 |
| Carbon | 130,000–690,000 |
| Cobalt | 11–16 |
| Copper | 12–110 |
| Magnesium | 100–1,700 |
| Manganese | 0–200 |
| Nickel | 16–40 |
| Sodium | 86,000–220,000 |
| Thallium | <.5 |
| Tin | 72–120 |
| Vanadium | 75–120 |
| Zinc | .1–63 |
| Alumina | 78,000–260,000 |
| Calcium | 5,000–64,000 |
| Iron Oxide | 3,000–28,000 |
| Phosphorous | 50–300 |
| Silicon Oxide | 7,000–109,000 |
| Sulfur | 0–3,000 |
| Fluorine | 99,000–182,000 |
| Ash % | 57.1–79.5 |

The glass formers which are mixed with the spent potlining are chosen in a manner to render a composition that can be melted with relative ease and, most importantly, can be crystallized to produce a glass ceramic. The preferred additives include soda-lime-silica glass cullet, flyash (utility boiler, municipal solid waste incinerator ash, auto shredder residue ash, etc.), electric arc furnace dust, limestone, gypsum, silica sand, alkaline earth metal oxides, alkali metal oxides, zinc oxide, borates, and/or nucleating agents. The preferred nucleating agents are titanium dioxides, zirconium oxide, phosphates, fluorides, Ag, and/or Au. Typical compositions of various flyashes and other glass forming additives are shown in Table 2.

TABLE 2

Composition of Typical Flyashes

| Compound | Boiler Flyash | Auto Shredder Residue Ash | Sewage Sludge Ash | Municipal Solid Waste Incinerator Ash |
|---|---|---|---|---|
| $SiO_2$ | 51.80 | 32.6 | 39.51 | 29.5 |
| $K_2O$ | 2.68 | | .54 | 1.57 |
| $Na_2O$ | 0.40 | | .98 | 4.05 |
| $Al_2O_3$ | 25.60 | 9.97 | 9.34 | 11.6 |
| CaO | 1.74 | 6.4 | 14.03 | 28.2 |
| MgO | 0.80 | | 2.52 | 1.8 |
| $Fe_2O_3$ | 10.30 | 23.65 | 8.83 | 2.77 |
| $P_2O_5$ | <0.10 | | 12.58 | |
| $TiO_2$ | 0.20 | | | |
| $Ag_2O$ | | | .0085 | <0.0010 |
| BaO | | | .21 | 0.11 |
| CdO | | | 0.0005 | 0.0065 |
| $Cr_2O_3$ | | 0.06 | 0.5 | 0.09 |
| PbO | | 0.82 | 0.109 | 0.36 |

TABLE 2-continued

Composition of Typical Flyashes

| Compound | Boiler Flyash | Auto Shredder Residue Ash | Sewage Sludge Ash | Municipal Solid Waste Incinerator Ash |
|---|---|---|---|---|
| MnO | | 0.22 | | |
| ZnO | | 3.07 | | |
| $As_2O_3$ | | | | 0.0034 |
| C | 2.00 | 9.55 | | 6.25 |
| $SO_3$ | 1.50 | 0.36 | .19 | 6.25 |
| F | | | | 0.01 |
| Se | | | 0.0002 | <1 ppm |
| Cl | | | | 6.8 |
| Hg | | | 0.0006 | 0.02 |

The typical compositions of electric arc furnace dust and gypsum are shown below in Table 3.

TABLE 3

Composition of Typical Electric Arc Furnace Dust and Gypsum

| Compound | Electric Arc Furnace Dust (all metals expressed as oxides) | Gypsum |
|---|---|---|
| $SiO_2$ | 3–8% | |
| $Al_2O_3$ | 0–2% | |
| $Fe_2O_3$ | 45–60% | |
| CaO | 4–8% | 32.6 |
| MgO | 1–5% | |
| $Na_2O$ | 1–5% | |
| $K_2O$ | 1–4% | |
| $TiO_2$ | 0–0.5% | |
| $P_2O_5$ | 0–1.0% | |
| Mn2O3 | 3–9% | |
| SrO | 0–1% | |
| CuO | 0–1% | |
| NiO | 0–0.5% | |
| CrO | 0–1% | |
| V2O5 | <0.01 | |
| ZnO | 10–16% | |
| PbO | 0–3% | |
| C | 0–5% | |
| $So_3$ | <0.01 | 46.5 |
| F | | |
| CN | | |
| Loss on Ignition | 3–10% | 21.0 (mostly water) |

The proportion of additives used in the process of the present invention is typically 35 to 80 wt. % spent potlining, 0 to 40 wt. % flyash (utility boiler, municipal solid waste incinerator ash, and/or auto shredder residue ash), 0 to 40 wt. % limestone (or gypsum), 0 to 30 wt. % silica, 0 to 40 wt. % soda-lime-silicate glass cullet, 0–5 wt. % titania, and 0–5 wt. % zirconia. A preferred feedstock to the process of the present invention is 5–20 wt. % $Na_2O$, 10–30 wt. % $Al_2O_3$, 5–20 wt. % CaO, 0–15 wt. % MgO, 0–8 wt. % $Fe_2O_3$, 35–70 wt. % $SiO_2$, 0–5 wt. % $B_2O_3$, 0–5 wt. % F, 0–10 wt. % $TiO_2$, 0–5 wt. % $ZrO_2$, and 0–5 wt. % other oxides. The other oxides include oxides of Cu, Mn, Ni, Zn, As, Pb, Ag, Au, and S, or mixtures thereof.

The process of the present invention follows the process flow diagram shown in FIG. 1. In this process flow scheme, spent potlining A and glass formers and other additives K are sent to a crusher 2 to produce a crushed composition B. This can be achieved in any suitable apparatus, for example, jaw crushers. The crushed material can then be further reduced in size, for example, by reducing 100% of the crushed material to less than about 6 mm, by use of impact mills. The size range desired for the comminuted spent potlining is within the size limits of about 100% minus 2–6 mm. Comminution allows a partial segregation of metallic aluminum from the balance of the spent potlining materials; the particles larger than 6 mm remaining after crushing contain most of the metallic aluminum, which can be readily sorted out and returned to remelting pots. Naturally, this separation is optional. The metallic aluminum in the spent potlining if desired can be readily converted to alumina during the process of the present invention, rendering separation superfluous.

Crushed composition B is sent to a blender 4. Glass formers and other additives K can also be added at this step. Blender 4 mixes the spent potlining and additives K to form homogeneous mixed composition C. Typically, blender 4 is a pneumatic or mechanical blender.

Mixed composition C is then conveyed to an oxidizing apparatus 6 where carbonaceous material in spent potlining A and glass forming and other additives K are combusted and heated, and then delivered to melting apparatus 7 where glass forming materials are vitrified. In oxidizing apparatus 6, oxidation is carried out at a temperature of 1000° C. to 1700° C. and a pressure of 0.9 to 1.1 atmospheres, preferably by suspension oxidation. In melting apparatus 7, vitrification is achieved at a temperature of 1100° C. to 1900° C. and at a pressure of 0.9 to 1.1 atmospheres, preferably using a cyclone melter. Bath, pot, open-hearth, or electric melters may also be utilized.

Figure 2:
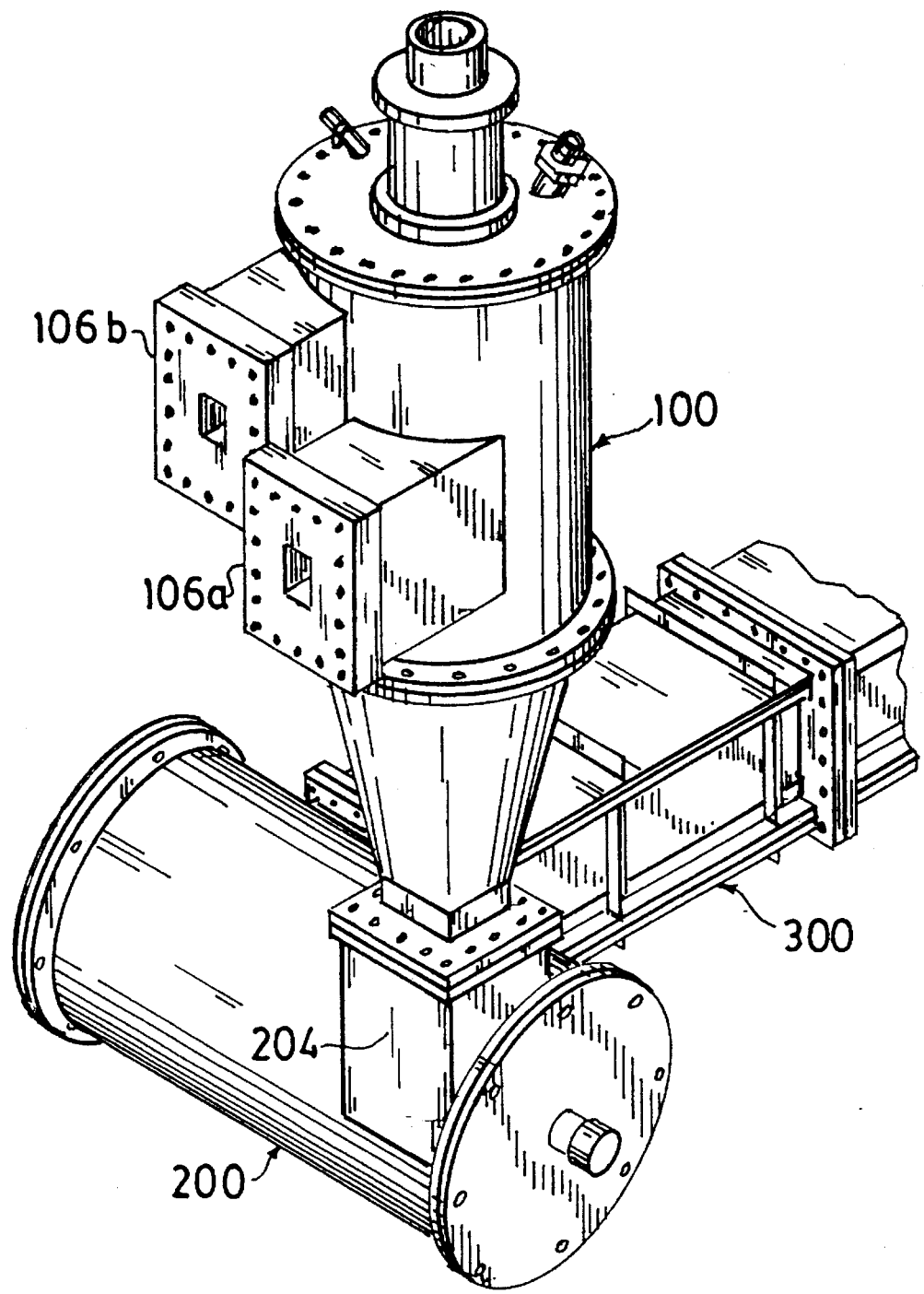
FIG. 2 is a perspective view of an apparatus useful in carrying out the process of the present invention.
Figure 3:
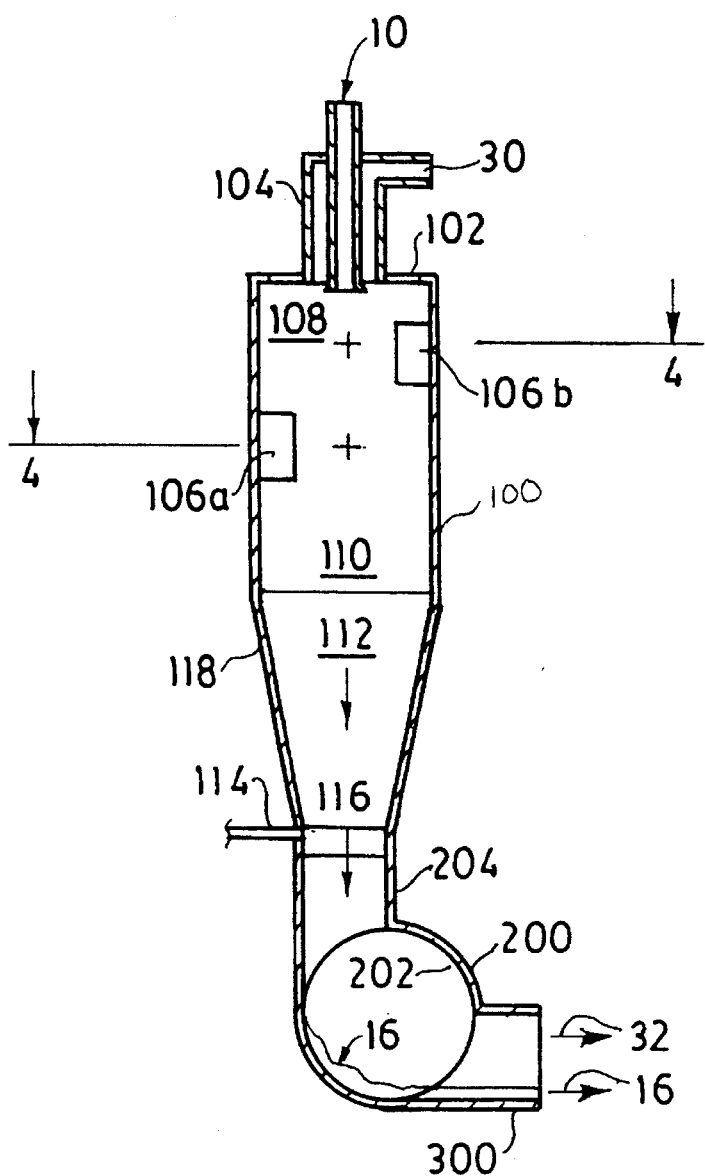
FIG. 3 is a side cross sectional view of the apparatus of FIG. 2.
Figure 4:
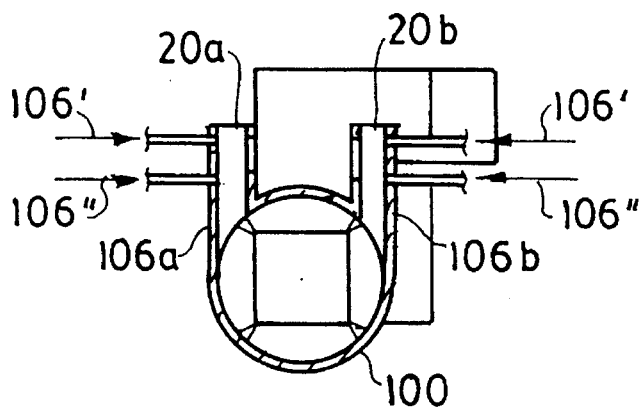
FIG. 4 is a top cross sectional view of the apparatus of FIG. 3 taken along line 4—4.

A particularly preferred form of melting apparatus 6 and melting apparatus 7 is the Combustion and Melting System manufactured by Vortec Corporation, Collegeville, Pa. This system is shown in FIGS. 2, 3, and 4 and is described in U.S. Pat. No. 4,957,527 to Hnat which is hereby incorporated by reference. See also U.S. Pat. No. 4,544,394 to Hnat which is hereby incorporated by reference.

FIG. 2 is a perspective view of the Combustion and Melting System used to practice the process of the present invention. The primary components of the apparatus of the invention include a suspension-type preheater chamber 100, cyclone melting chamber 200 at the discharge end of the preheater chamber 100, and cyclone exit assembly 300 at the discharge end of melting chamber 200. Other components, such as a gasifier and plasma torch preheater can be incorporated into this system. See U.S. Pat. No. 4,957,527.

As shown in FIG. 3, fuel 30 is introduced into top or head end 102 of the preheater 100. Fuel 30 is introduced along with glass batch material 10 through injector assembly 104 which is located at head end 102 of preheater 100 and which is coaxial with the longitudinal axis of the preheater chamber 100.

The preheating step is very important to the invention. The well stirred/plug flow suspension preheater 100 enhances convective heat transfer to particulate matter, while providing combustion stabilization when combustion occurs within the preheater vessel. Due to the intense mixing, rapid heat release in the combustion processes takes place. By selecting the proper injection location and velocity, the interaction of the particulate mineral matter with the walls of the preheater can be either minimized or maximized. Axial injection will tend to minimize interaction with the preheater wall, while tangential injection tends to maximize the interaction with the reactor wall, particularly where high levels of swirl are utilized.

As shown in FIG. 4, preheated air or other suitable gaseous oxidizing material 20a, 20b is introduced into preheater 100 through two or more inlet ports 106a, 106b. These gaseous oxidizing materials 20a, 20b are introduced in such a manner that they produce turbulent mixing of injected fuel 30 with oxidizing material 20a, 20b and glass batch material 10 (i.e. crusted composition B from FIG. 1). The result is a mixture of fuel, oxidizer, and glass forming materials in upper region 108 of preheater 100. Within upper region 108, the gases present are well stirred or well mixed, but particulate matter (e.g., glass forming materials) in region 108 is not necessarily well stirred or evenly distributed throughout the volume of region 108.

When a counter-rotating preheater is used, as shown in FIGS. 3 and 4, inlet ports 106a, 106b are tangential to the vessel walls and are spaced at different levels. The jets are typically vertically spaced on the order of ¼ to 2 reactor diameter apart.

The combustion of fuel 30 and oxidizing material 20a, 20b within upper region 108 of preheater 100 results in a high intensity heat release and further results in a rapid rate of heat transfer to the particulate matter (e.g. the glass forming materials) suspended in the gas flow within this region. Burning within the preheater occurs via the mixing and stirring of fuel and oxidizer within the well-stirred region of the reactor. Ignition occurs within the preheater with the aid of a pilot burner or conventional electrical ignition assembly. In the preferred embodiment, high temperature air preheat (>500° C.) is provided via a commercially available heat recuperator. In these cases, radiation from the preferred refractory lined reactor walls will generally establish auto ignition of the various fuel and oxidizer mixtures to be used. Strong recirculation in upper region 108 of preheater 100 is created by counter-rotating vortices or impinging jets, thus providing the primary means of flame stabilization within the preheater. Without this strong recirculation of the combustion gases, flame extinguishment tends to occur due to the quenching of the flame by inert batch materials or other mineral matter within the preheater assembly. This is particularly true of mineral matter, such as limestone, which liberates substantial amounts of $CO_2$ upon heating. When low heating value fuels are used, auxiliary gas injection, separate igniters, or pilot burners can also be used to achieve flame stabilization within the preheater.

When preheater 100 is a cylindrical-type combustion chamber, primary flame and heat release occurs in upper region 108 which occupies a chamber volume with a length to diameter ratio of approximately 0.5:1–3.0:1, preferably 1:1. The strong mixing of the fuel and oxidizer within this region permits the effective combustion of many types of fuels, including gaseous, liquid, solid or liquid-solid slurry type fuels.

Downstream of upper region 108 within the preheater 100 is lower or plug flow region 110 where a plug flow of gas and solid or liquid particles is produced and where final combustion of fuel 30 is completed. By plug flow, it is meant that gas recirculation patterns have abated and the primary direction of flow is parallel to the longitudinal axis of the reactor. The effective length-to-diameter ratio of plug flow region 110 is, again, approximately 0.5:1–3.0:1, preferably, 1:1. The gaseous materials, fuel 30, oxidizers 20a, 20b, and entrained glass batch materials 10 within plug flow region 110 are accelerated through converging section 112 of preheater chamber 100. From converging section 112, the gas and entrained batch materials are delivered into cyclone-type melting chamber 200 where secondary combustion occurs at an average temperature which exceeds the melting point of the glass product, and where separation, dispersion, mixing, and melting of the preheated batch materials occurs along walls 202.

It is the intention of the present invention to heat the batch materials in suspension and to minimize liquid glass formation along the walls of preheater 100. However, when low melting point species are included as part of the batch mixture, some liquid glass species formation will occur along the walls of the preheater by vapor phase condensation or by turbulent deposition.

Melted glass product 16 formed on walls 202 of cyclone melting chamber 200 and hot gases 32 from cyclone chamber exit cyclone melting chamber 200 through exhaust duct assembly 300 which is preferably positioned tangential to the walls of the cyclone melting chamber. An exit channel along the longitudinal axis of the cyclone melter is also possible.

Returning to FIG. 1, in this form of oxidizing apparatus 6, rapid carbon burnout takes place in the initial stages of the thermal treatment when finely divided spent potlining and additives are suspended in a highly turbulent oxygen rich combustion region of a suspension preheater. The suspension preheater preferably is a counter/rotating vortex combustor. During oxidation of the mixed composition, all of the carbonaceous material is oxidized and some of the fluorine present is volatilized. Both the combustion by-products and the fluorine are released from the system in the form of flue gas J. Fluorine may later be recovered by contacting flue gas J with powdered alumina, which converts fluorine to aluminum fluoride. Aluminum fluoride can be reused in the electrolytic smelting of aluminum.

Cyanides also undergo degradation in the oxidizing apparatus 6. In the presence of oxygen, cyanides are converted to innocuous nitrogen and carbon dioxide gases.

Portions of mixed composition A which are not melted in melting apparatus 7 into molten mass D are withdrawn in flue gas J. Molten mass D is removed from melting apparatus 7 and fed to shape fabrication machinery 8 where it is pressed into tiles of desired shapes and sizes. Shape fabrication machinery 8 is a molding machine conventionally used in the glass industry. During shape forming, molten mass D, consisting of vitreous materials, cools down and becomes a rigid solid as it is formed into the shape of a tile. The most desireable tile shapes are 4"×4", 8"×8", 12"×12", and 18"×18" tiles of varying thicknesses, typically in the range of ¼" to 1".

Shaped material E produced by shape fabrication machine 8 is heat treated to induce nucleation and crystallization. This heat treatment takes place in the heat treatment kiln 10. A typical heat treatment for nucleation and crystallization cycle is shown in FIG. 5.

Figure 5:
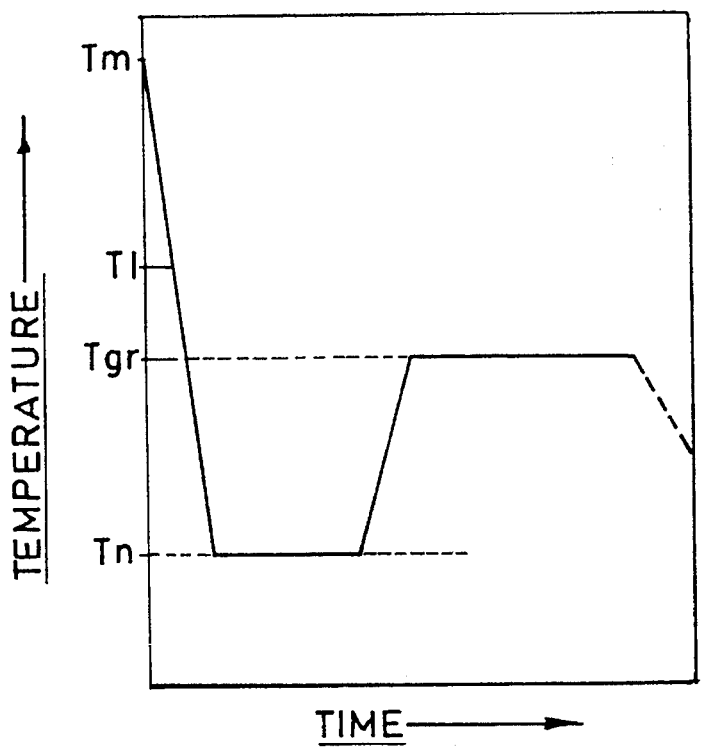
FIG. 5 is a plot of temperature versus time to depict the thermal treatment of shaped material in a heat treatment kiln.

During a first time period, shaped material E in heat treatment kiln 10, is cooled from its melting temperature, $T_m$ (i.e., the temperature of molten mass D in melting apparatus 7) to the nucleation temperature, $T_n$, as shown in FIG. 5. This phase, which typically takes between 1–5 minutes, reduces the temperature of shaped material E to a value of 400° to 600° C., a temperature at which nucleation occurs. Typically, the rate of temperature reduction is 50° to 200° C./hour to $T_n$. Such nucleation is facilitated by incorporating a nucleating agent in feed stream K as discussed above.

To cause crystallization, shaped material E is next subjected to a second phase heat treatment in which it is held at $T_n$ for a time period of between 30 minutes to 2 hours, as shown in FIG. 5. During this phase of the process, shaped material E is subjected to a temperature of 800° to 900° C. The purpose of this second phase heat treatment is to create nuclei for further crystallization.

In a third phase heat treatment, as shown in FIG. 5, shaped material E is reheated to crystallization temperature, $T_{gr}$ (i.e. 950°–1150° C.), and held for between 30 minutes to 2 hours.

The time required for the heat treatment cycle is dependent upon the amount and type of nucleating agent used with the additives. During this temperature increase, the temperature of shaped material E is increased at a rate 50° to 200° C./hour. Typically $T_{gr}$ is 950° to 1150° C.

The heat treatment process shown in FIG. 5 results in the formation of glass-ceramic tile F. Following such heat treatment, the glass-ceramic tile F either is delivered directly to hot glazing apparatus 16 or is removed from the heat treatment kiln 10 and allowed to cool prior to treating with a cold glazing apparatus 12.

The glass-ceramic tile F is typically glazed to produce glass-ceramic tiles with various colors and textures. Suitable glazes are commercially available and are similar to those used in current tile making practice.

Figure 6:
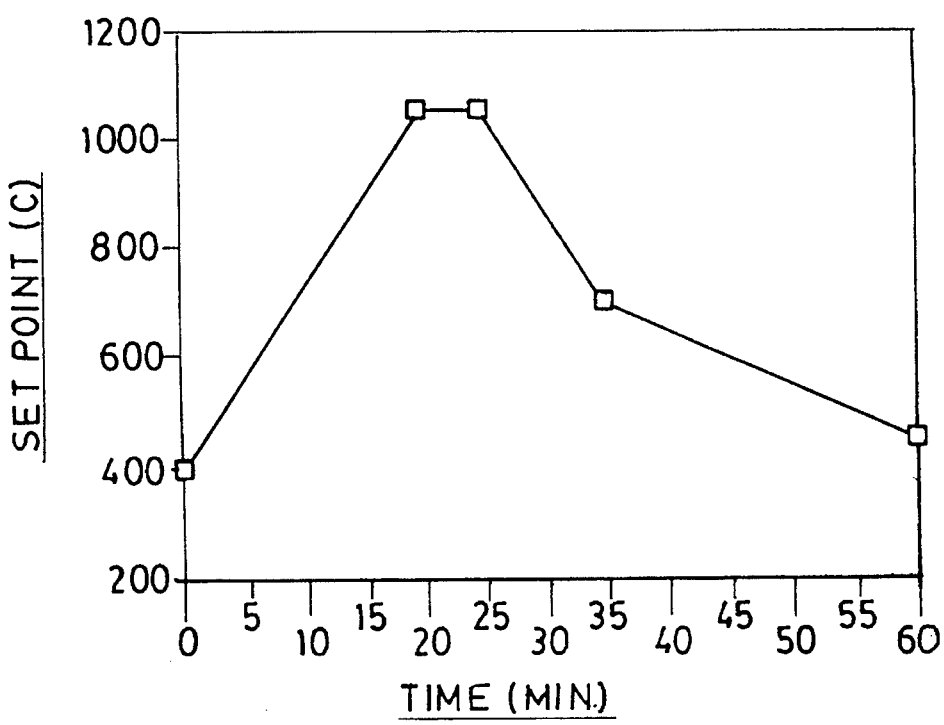
FIG. 6 is a plot of temperature versus time to depict the thermal treatment of the glaze in a hot glazing apparatus.

The glass-ceramic tile F may be treated in hot glazing apparatus 16 to produce hot glazed tile G. Such hot glazing typically involves applying a dry glaze powder on the surface of the hot tile body immediately after crystallization. A typical glaze heat treatment cycle is shown in FIG. 6. Temperatures typically used in hot glazing apparatus 16 range from 800° to 1400° C., with the desirable maximum temperature being 1060° C. The most desirable firing time is 55 minutes.

Alternatively, glass-ceramic tile F may be treated in cold glazing apparatus 12 to produce cold glazed tile H. The glaze is applied to glass-ceramic tile F using various devices such as glazing bells, rotating discs, air assisted spray guns, or other conventional tile glaze application techniques. Cold glazed tile H is dried in air at ambient temperatures and then fired at a low temperature, typically from 530° to 850° C. To avoid excessive stress buildup, cold glazed tile H is next cooled slowly (i.e., at a rate of 25°–100° C./hour) to room temperature, depending on tile thickness. Low temperature glazing produces a glass-ceramic tile which is opaque rather than translucent, imparting a gloss to the surface rather than the "depth" of the tile. Cold glazed tile H may then be heated in heating apparatus 14, at a temperature of 800° to 1000° C., to produce a glazed tile I.

Properties of glass-ceramic tiles F include thermal stability up to 1100° C., chemical durability equivalent to or better than the commercial glasses, and mechanical strength equal to or better than that of commercial ceramic tiles, i.e. a breaking strength of 500 to 720 lbs, for typical wall tiles with 7.5 mm thickness. In comparison, conventional clay based tiles have breaking strengths less than 200 lbs. The most desirable glass-ceramic tile composition obtained from the above mixed composition C will consist of 5–20 wt. % $Na_2O$, 10–30 wt. % $Al_2O_3$, 5–20 wt. % CaO, 0–15 wt. % MgO, 0–8 wt. % $Fe_2O_3$, 35–70 wt. % $SiO_2$, 0–5 wt. % $B_2O_3$, 0–5 wt. % F, 0–10 wt. % $TiO_2$, 0–5 wt. % $ZrO_2$, 0–5 wt. % other oxides. Preferably, the other oxides will be oxides of copper, manganese, nickel, zinc, arsenic, lead, gold, silver, sulfur, and mixtures thereof.

EXAMPLES

Example 1

A mixture consisting of 60% spent potlining, 15% limestone, 12.5% silica sand, and 12.5% soda-lime-silica cullet was crushed to a maximum particle size of 1 mm. The crushed feedstock was melted in the Combustion and Melting System (Vortec Corporation, Collegeville, Pa.) ("CMS") at a maximum temperature of 1350° C. The molten material was fabricated to the shape of 4"×4" tile. The tile was heat treated by holding it at the nucleation temperature of 750° C. for 1 hour and by then crystallizing at 950° C. for 2 hours. The resulting product is a glass-ceramic tile with a strength 3–6 times superior to that of conventional wall tile.

Example 2

A mixture of 57% spent potlining, 9.5% limestone, 28.5% utility boiler flyash, and 5.0% titania was crushed to a maximum particle size of 1 mm. The crushed feedstock was melted in the CMS at a maximum temperature of 1350° C. The molten material was fabricated to the shape of 4"×4" tile. The tile was heat treated by holding it at the nucleation temperature of 705° C. for 1 hour and then crystallizing at 950° C. for 1 hour. The resulting product is a glass-ceramic tile with a strength 3–6 times superior to that of conventional wall tile.

Example 3

Spent potlining was crushed to a maximum particle size of 2 mm and was burnt in an atmosphere of flowing air in an oven at a temperature of 800° C. for several hours. A mixture was prepared that consisted of 65% burnt spent potlining, 15% limestone, 15% silica sand, and 5.0% titania. The feedstock was melted in a furnace equipped with molybdenum disilicide heating elements at a maximum temperature of 1500° C. The molten material was fabricated to the shape of 4"×4" tile. The tile was heat treated by holding it at the nucleation temperature of 750° C. for 1 hour and then crystallizing at 1000° C. for 0.5 hours. The resulting product is a glass-ceramic tile with a strength 6 times superior to that of conventional wall tile.

The following Examples 4–7 are substantially the same as Example 1 except for the changes noted.

Example 4

5 wt. % titania was added to the mixture of spent potlining, limestone, silica, and soda-lime-silica as a nucleating agent. The resulting product is a glass-ceramic tile with a strength 6 times superior to that of conventional wall tile.

Example 5

5 wt. % zirconia was added to the mixture of spent potlining, limestone, silica, and soda-lime-silica as a nucleating agent. The resulting product is a glass-ceramic tile with a strength 6 times superior to that of conventional wall tile.

Example 6

Dolomite was used in place of limestone. The resulting product is a glass-ceramic tile with a strength 6 times superior to that of conventional wall tile.

Example 7

Insulation fiberglass cullet was used in place of soda-lime-silica cullet. The resulting product is a glass-ceramic tile with a strength 6 times superior to the conventional wall tile.

The following Examples 8–10 are substantially the same as Example 2 except for the changes noted.

Example 8

Municipal solid waste incinerator ash was used in place of utility boiler flyash. The resulting product is a glass-ceramic tile with a strength 6 times superior to that of conventional wall tile.

Example 9

Auto shredder residue flyash was used in place of utility boiler flyash. The resulting product is a glass-ceramic tile with a strength 6 times superior to that of conventional wall tile.

Example 10

Electric arc furnace dust was used along with boiler flyash, with the electric arc furnace dust replacing 35 wt % boiler flyash. The resulting product is a glass-ceramic tile with a strength 6 times superior to that of conventional wall tile.

Example 11

The glazes commonly used in the whiteware industry have maturing temperatures ranging from 800° to 1400° C. The modern tile industry uses glazes that can be fast fired (20 to 55 minute cycles) and matured at a maximum temperature of 1050° C. In order to produce tiles that look and feel similar to whiteware tiles, glazes used by the U.S. tile industry were studied. The fast firing schedules used in conventional tile manufacturing were also examined and a modified version, ideal for glass-ceramic tiles, was developed. The modified glass-ceramic firing schedule is shown in FIG. 6.

Typical glazes were prepared by using a 90% JM Cerene #5253, as provided by Johnson Matthey Co., and 10% clay. The glaze was made into a slurry for application to the tiles by adding a dispersant (0.001%), magnesium carbonate (0.0002%), about 40 drops of the slurry thinner, and water (approximately 40% of total weight). The mixture was ball milled for 45 minutes. A specific gravity of 1.82 was achieved. Approximately 3 grams of glaze was applied to the 2"×2" squares and approximately 12 grams was applied to the 4¼"×4¼" samples using a spray gun. The glaze was dried in air and fired. Tests were done using different firing times. Samples were fired in the kiln for a total time of between 20 to 55 minutes, with maximum temperatures of 1060° C. Visual examination of the glazed tiles revealed that a 55 minute cycle produced a smoother surface.

A test was also performed to compare JM Cerene glaze and American Olean glaze. The glass-ceramic tiles were sprayed with either glaze made up of 95% Cerene glaze and 5% clay or an American Olean glaze. Both sets were fired using the 55 minute cycle. The JM Cerene glaze had superior performance. The American Olean glaze failed to mask the tile surface completely, appearing partially transparent.

Another test was undertaken to attempt to improve the performance of the American Olean glaze on the glass-ceramic tiles. An engobe coating was applied to the tile surface prior to the application of the American Olean glaze. Engobes are matte, clay-based coatings that may also be porous. The tiles with the engobe and American Olean glaze coatings were then fired using the 55 minute firing cycle. Although the surface coverage was better than that of the tile treated only with the American Olean glaze, the surface of the glass-ceramic tile was still visible.

Example 12

Testing was performed to determine various properties of glass or glass-ceramic tiles. The properties were measured following ASTM methods.

Dimensional Stability of the Tile

The quality control requirements for the wall tiles are as following:
1. The required tile dimensions: 4¼"×4¼"×0.295"
2. Dimensional tolerance ±0.015"
3. Warpage not to exceed 0.025" across diagonal The above tolerances were checked by a commercial tile manufacturer using the ASTM designation C 485-83 for warpage and ASTM C499-78 for facial dimensions. Both glass and the glass-ceramic tiles meet the above stated requirements.

Breaking Strength

The breaking strength of the glass-ceramic tiles was measured by using ASTM designation C648-84. The experiment was conducted by a commercial tile manufacturer using the instrumentation constructed to the specifications of ASTM C648-84. The strength of glass and glass-ceramic tiles exceeded 600 lb. It is obvious that the breaking strength of glass-ceramic tiles is considerably superior to those of various types of conventional tiles. Higher breaking strengths is a desirable attribute in all construction tiles provided the tiles may be cut into smaller pieces by the conventional techniques used by the tile installers. All the glass and glass-ceramic tiles studied in this research can be cut using the traditional equipment.

Water Absorption

The glass-ceramic tiles are derived from vitreous materials which generally do not have any porosity. The glass-ceramics are free of porosity to a large extent as well, but in some cases, due to the thermal expansion difference between the glass and the glass-ceramics, some small amount of porosity (<0.5%) may develop during the ceramming process. The water absorption tests (ASTM C373-72) indicated no weight gain in any of the glass-ceramics made in this research.

Crazing

This test was performed by a ceramic tile manufacturer to determine the crazing resistance of the fired, glazed, glass-ceramic tiles using the autoclave treatment according to the ASTM designation C424-80.

This test involved placing the tile inside an autoclave on a suitable support. Sufficient amount of water was added, and the autoclave was closed securely. The water was heated gradually, and the blow-off valve of the autoclave was closed after steam began to escape, thereby expelling most of the air. The pressure was allowed to increase at a constant rate for about 45 minutes to the desired value. This pressure was kept constant for one additional hour. The heat source was then shut off and the pressure was released. The specimen was removed from the autoclave after it cooled to room temperature. The tile surface was examined by naked eye for crazing failure.

The first test was made at the maximum pressure of 50 psi; no crazing occurred. The test was repeated at 100, 150, 200, and 250 psi. None of the samples crazed.

Thermal Shock Resistance of Glazed Tiles

This test was performed at a commercial tile manufacturer to determine the thermal shock resistance of the fired, glazed, glass-ceramic tiles according to the ASTM designation C484-66.

The method consisted of placing the glazed sample in an oven at a temperature of 145° C. (±5° C.), for 30 minutes, removing it from the oven, placing it on a thin sheet of aluminum maintained at 24° C. (±3° C.), and inspecting the tile after 15 minutes for shivering or any other type of disintegration. The undamaged tile was returned to the oven and the same cycle was repeated for five times. The glazed, glass-ceramic tiles survived all the thermal shock cycles.

Hardness

The hardness of glass and glass-ceramic tiles was measured by the Knoop indentation hardness tester. These data were converted to Mhos scale.

On Mohs scale, the hardness of glass-ceramics is close to 7. Hardness of a conventional bisque is considerably less.

For the wall and floor tile glazes, the hardness test was conducted by using Mohs standard scratch test. The hardness values for wall and floor tiles was 6.5 and 7.5, respectively, on the Mohs scale.

Resistance to Freeze-Thaw Cycling

This test was performed by a commercial tile manufacturer to determine the resistance to freeze-thaw cycling of the fired, glazed, glass-ceramic tiles according to the ASTM designation C1026-84.

The test procedure consisted of placing a water saturated tile sample in a freezer maintained at $-18°$ C. for a short time and then placing the tile in water maintained at $16°$ C. The tile was removed from the water after thawing and examined for any damage. The freezing and thawing was done 5 times on the same sample. The glass-ceramic samples survived the cycling without any damage when observed under ultra violet light.

Thermal Expansion

The thermal expansion of the glass-ceramic samples was measured primarily to find a suitable glaze for surface decoration. The coefficient of thermal expansions of various compositions are $(80 \text{ to } 110) \times 10^{-7}/°$ C.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of forming glass ceramic tiles comprising:
   providing spent aluminum potliner containing carbonaceous material, fluorine, and glass-forming materials;
   oxidizing the spent aluminum potliner under conditions effective to combust the carbonaceous material and to volatilize partially the fluorine in the glass-forming materials;
   vitrifying the oxidized glass forming materials to form a glass melt; and
   forming the glass melt into tiles containing fluorine.

2. A process according to claim 1, wherein said oxidizing is carried out in a suspension preheater in which the spent aluminum potliner containing the carbonaceous material, the fluorine, and the glass-forming materials are suspended in an oxidizing fluid.

3. A process according to claim 2, wherein said suspension preheater is a counter-rotating vortex suspension preheater.

4. A process according to claim 2, wherein said vitrifying is carried out in a cyclone melting chamber.

5. A process according to claim 1, wherein said vitrifying is carried out in a cyclone melting chamber.

6. A process according to claim 1, wherein said vitrifying is carried out in a open-hearth melter.

7. A process according to claim 1, wherein said vitrifying is carried out in an electric melter.

8. A process according to claim 1, wherein said oxidizing is carried out at a temperature of $1000°$ to $1700°$ C.

9. A process according to claim 1, wherein said vitrifying is carried out at temperature of $1100°$ to $1900°$ C.

10. A process according to claim 1 further comprising:
    mixing the spent aluminum potliner with an additive selected from the group consisting of flyash, limestone, gypsum, silica, sodium-lime-silica glass cullet, titania, zirconia, and mixtures thereof prior to said thermally treating to form a mixture.

11. A process according to claim 8, wherein the mixture contains 35–80 wt. % spent aluminum potliner, up to 40 wt. % flyash, up to 40 wt. % limestone, up to 40 wt. % gypsum, up to 30 wt. % silica, up to 40 wt. % sodium-lime-silica glass cullet, up to 5 wt. % titania, and up to 5 wt. % zirconia.

12. A process according to claim 8, wherein the tiles contain 5–20 wt. % $Na_2O$, 10–30 wt. % $Al_2O_3$, 5–20 wt. % CaO, 0–15 wt. % MgO, 0–8 wt. % $Fe_2O_3$, 35–70 wt. % $SiO_2$, 0–5 wt. % $B_2O_3$, 0–5 wt. % F, 0–10 wt. % $TiO_2$, 0–5 wt. % $ZrO_2$, and 0–5 wt. % other oxides.

13. A process according to claim 12, wherein the other oxides are selected from the group consisting of oxides of copper, manganese, nickel, zinc, arsenic, lead, gold, silver, sulfur, and mixtures thereof.

14. A process according to claim 1 further comprising:
    comminuting the spent aluminum potliner prior to said oxidizing.

15. A process according to claim 1 further comprising:
    cooling the tiles to effect nucleation and
    heating the tiles after said cooling to cause crystallization of said tiles.

16. A process according to claim 13 further comprising:
    heat treating the tiles after said heating to cause crystallization and
    glazing the heat treated tiles.

17. A process according to claim 14, wherein said glazing is carried out at a temperature of from $400°$ C. to $800°$ C.

18. A process according to claim 14, wherein said glazing is carried out after said cooling.

19. A process according to claim 16 further comprising:
    heat treating the glazed tiles.

20. A process of forming glass ceramic tiles comprising:
    providing spent aluminum potliner containing carbonaceous material, fluorine, and glass-forming materials;
    oxidizing the spent aluminum potliner under conditions effective to combust the carbonaceous material and to volatilize partially the fluorine in the glass-forming materials, wherein said oxidizing is carried out in a suspension preheater in which the spent aluminum potliner, the carbonaceous material, the fluorine, and the glass-forming materials are entrained in an oxidizing fluid;
    vitrifying the oxidized glass forming materials to form a glass melt, wherein said vitrifying is carried out in a cyclone melting chamber; and
    forming the glass melt into tiles containing fluorine;
    cooling the tiles to effect nucleation;
    heating the tiles after said cooling to cause crystallization of said tiles; and
    glazing the heat treated tiles.

* * * * *

UNITED STATES PATENT AND TRADEMARK OFFICE
CERTIFICATE OF CORRECTION

PATENT NO. : 5,558,690
DATED : September 24, 1996
INVENTOR(S) : Hnat et al.

It is certified that error appears in the above-identified patent and that said Letters Patent is hereby corrected as shown below:

Claim 10, lines 5-6, delete "thermally treating" and and insert --oxidizing--.

Claim 11, line 1, replace "8" with --10--.

Claim 16, line 1, replace "13" with --15--.

Claim 17, line 1, replace "14" with --16--.

Claim 18, line 1, replace "14" with --16--.

Signed and Sealed this

Twenty-seventh Day of January, 1998

Attest:

BRUCE LEHMAN

*Attesting Officer*  *Commissioner of Patents and Trademarks*